United States Patent [19]

Engel et al.

[11] Patent Number: 4,922,328

[45] Date of Patent: May 1, 1990

[54] VELOCITY CONTROLLED CRT AUTO TRACKING SYSTEM

[75] Inventors: Christopher M. Engel; Khosro M. Rabii, both of Arlington Heights, Ill.

[73] Assignee: Zenith Electronics Corporation, Glenview, Ill.

[21] Appl. No.: 327,937

[22] Filed: Mar. 23, 1989

[51] Int. Cl.$^5$ ........................................... H04N 17/04
[52] U.S. Cl. ..................................... 358/10; 358/139
[58] Field of Search ..................... 358/74, 65, 64, 10, 358/29, 34, 243, 242, 139, 172, 171; 340/701, 703

[56] References Cited

U.S. PATENT DOCUMENTS 4,562,479 12/1985 McDonald ............................ 358/74
4,587,566 5/1986 Hinn ..................................... 358/65
4,723,158 2/1988 White .................................... 358/65

*Primary Examiner*—James J. Groody
*Assistant Examiner*—Amir Zarabian

[57] ABSTRACT

A digital auto tracking system compares sampled operating data from a CRT with corresponding reference data and develops an error signal therefrom. The error signal is truncated to produce a desensitized three bit error signal. Three AND gates each have one input supplied with the three error bits, respectively, and three programmable velocity control bits are supplied to the other inputs by a microprocessor. A demultiplexer has a plurality of input taps that are coupled together so as to provide a minimum of zero and a maximum of seven clock pulses depending upon the outputs of the AND gates. The clock pulses sequence up/down counters in accordance with the derived error signal. The speed or velocity of change in response to the error signal is determined by the velocity control bits which may be microprocessor controlled for optimum block and white tracking of the particular cathode ray tube.

8 Claims, 2 Drawing Sheets

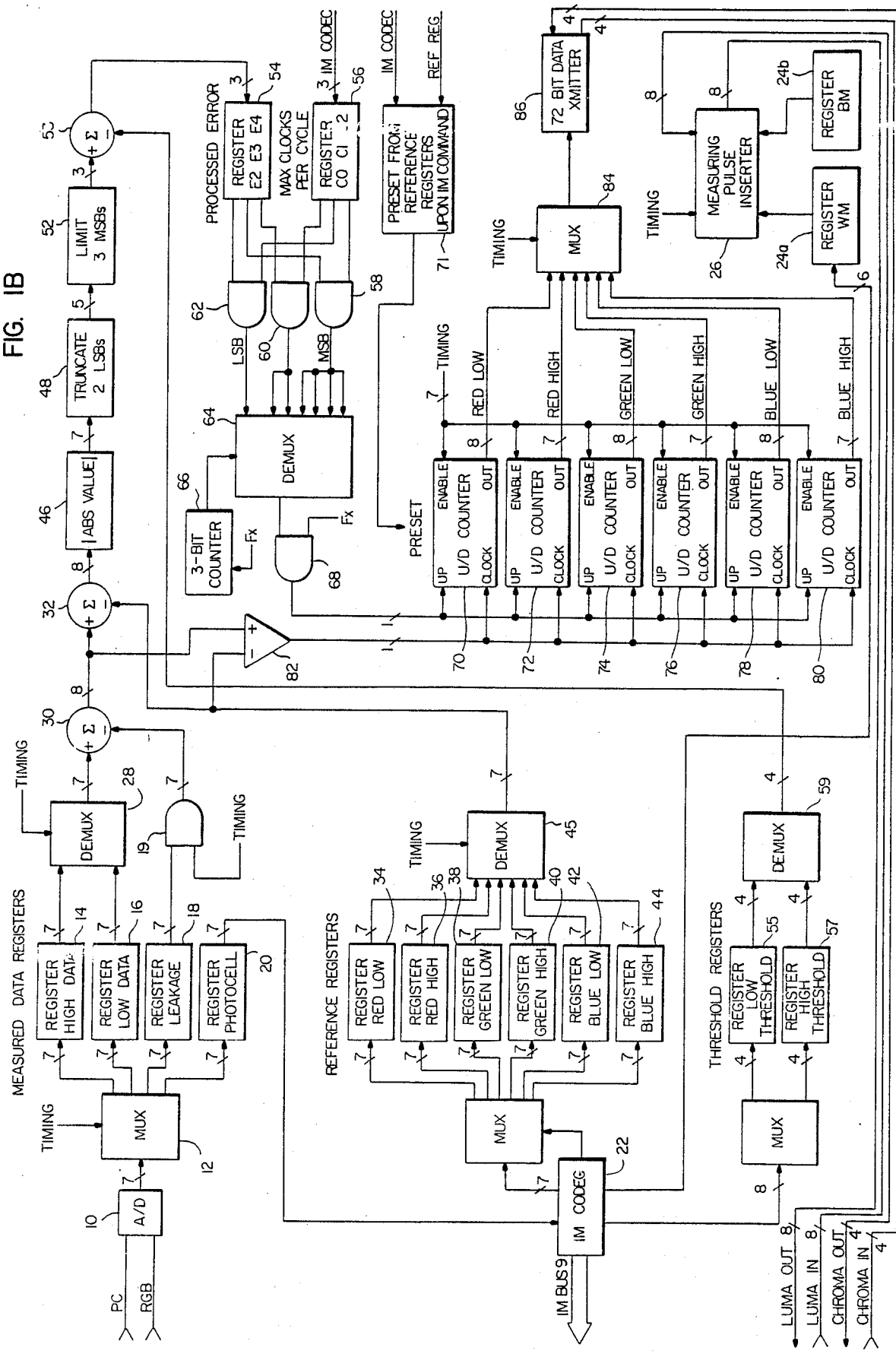

VELOCITY CONTROLLED CRT AUTO TRACKING SYSTEM

BACKGROUND OF THE INVENTION AND PRIOR ART

This invention relates generally to cathode ray tube (CRT) automatic tracking circuits that compensate for changes or variations in CRT display characteristics and particularly to an automatic tracking system that is digitally implemented.

Digital television receivers cannot use most conventional analog signal processing circuits. The ready availability of powerful microprocessors and low cost memories enables a significant amount of digital signal processing, however. In an NTSC discrete pixel CRT display, there are approximately 910 pixels per horizontal scanning line of the CRT screen. With suitable digital processing, exact control of each pixel may be obtained.

It is conventional in the art to provide automatic tracking circuits to compensate for CRT "aging." For example, the cutoff characteristic of the CRT may change or its color balance, that is the operational relationship between the red, green and blue electron gun structures may vary and lead to erroneous or poor black and white tracking. In digital television systems, it is known to artificially generate test signals for sampling the pertinent CRT characteristics. The test signals are multiplexed and applied during the vertical blanking interval (VBI) of the television signal to monitor the CRT display characteristics and to enable it to be compensated for deviations from a norm or set of reference values that have been established at the factory. In the ITT publication—DIGIT 2000 VLSI Digital Television System—a complete digitized television receiver system is disclosed. Digital television receivers operating in accordance with that publication are in the prior art. One such television receiver is identified as the Zenith Electronics Corporation, Model No. SE3191H. That television receiver (and the receiver of the publication) applies a series of test signals to a CRT during the vertical blanking interval for determining certain display characteristics. The signals are applied and the resulting data developed in a time multiplexed manner. These signals represent the individual red (R), green (G) and blue (B) cathode currents developed in response to an applied white level test signal and the individual color currents that are developed in response to an applied black level test signal. The results of the test signals are detected and compared with stored reference levels, or values, for those signals. Deviations between the measured data and the reference data are compensated by appropriately changing the operating characteristics of the R, G, and B amplifiers in the television receiver.

In a conventional direct view television receiver, the display area of the CRT is overscanned so that the horizontal lines at the beginning and the end of the VBI are not visible. If the display were vertically displaced to show these horizontal lines, the applied test signals would appear as a multicolored group of lines. In a rear projection television receiver, masking of the display area can be used to hide the test signal lines. In a front projection system, however, masking of the lines caused by the test signals is not readily feasible, and the lines are often annoying to a viewer.

As mentioned, the test signals are multiplexed and applied over a number of sequential fields of the television signal. While the actual number of fields is not critical, in the preferred embodiment of the invention, four successive fields are used. During the first video field, ambient light and CRT leakage signals are sampled; in the next field, the red cathode currents produced in response to the white and black level test signals are sensed; in the following field, the green cathode currents produced in response to the white and black level test signals are sensed; and in the fourth field, the blue cathode currents produced in response to the white and black level test signals are sensed.

In prior art auto tracking systems, the rate of correction is fixed and represents a compromise between rapid correction of the CRT display characteristics and slow correction. Making corrections too rapidly is disturbing in that color and brightness changes will be clearly visible to the viewer. Very slow changes are objectionable in that unbalanced or erroneous signal conditions can remain uncorrected for excessively long periods of time.

With the invention, the velocity or speed of correction is controllable by the manufacturer or designer. This is preferably accomplished in software. Different types of cathode ray tubes can thus be compensated for display characteristic variations at different rates of speed. For example, if a CRT type that is known to be very stable is used, correction may be performed at a slow rate or the correction circuitry may even be disabled. On the other hand, for front projection receivers, it may be desirable to initially correct at a high rate of speed for a few minutes and then to disable the correction circuitry to quickly remove the visible test signal pattern. As will be seen, the inventive system further provides for desensitizing the error signal to minimize small corrections by increasing the amount of error required to initiate a correction sequence.

OBJECTS OF THE INVENTION

A principal object of the invention is to provide a novel auto tracking system for a color television receiver.

Another object of the invention is to provide an auto tracking system that is digitally implemented.

A further object of the invention is to provide an auto tracking system wherein the speed of correction is variable.

BRIEF DESCRIPTION OF THE DRAWINGS

These and other objects and advantages of the invention will be apparent upon reading the following description in conjunction with the drawings, in which:

FIGS. 1A and 1B, when combined, depict a partial block diagram of a digital television system incorporating the invention.

DESCRIPTION OF THE PREFERRED EMBODIMENT

Figure 1A:
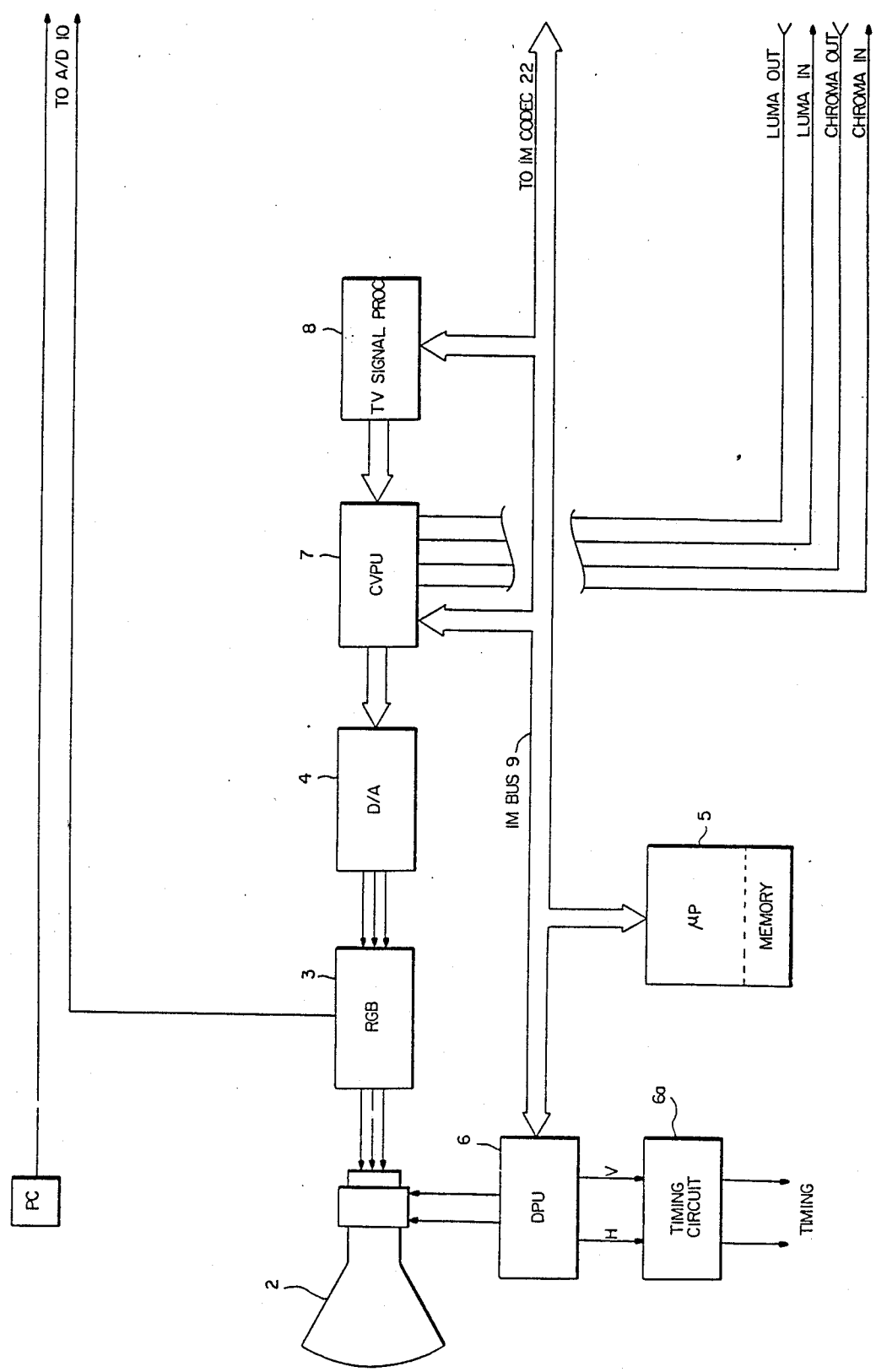

The drawings should be aligned as indicated by the labelled arrows with FIG. 1A positioned to the left of FIG. 1B. The lead lines interconnecting the various functional blocks are marked with numbers that indicate the number of wires contained in the lead line. A color CRT 2 is supplied with red, green and blue color signals from an RGB source 3 that is, in turn, coupled to a digital to analog (D/A) converter 4. A microprocessor 5, that includes a memory, is coupled to the functional modules of a digital television receiver by means of a bidirectional IM bus 9. A deflection processing unit (DPU) 6 is coupled to suitable deflection windings situated on the neck of CRT 2 and to microprocessor 5 via IM bus 9. Horizontal and vertical rate signals are coupled from DPU 6 to a timing circuit 6a which provides a number of timing signals that control the various functions in the receiver. A color video processing unit (CVPU) 7 supplies digital data to D/A 4 and is, in turn, supplied with information from TV signal processing means 8. CVPU 7 and TV signal processing means 8 are coupled to and controlled by microprocessor 5 via IM bus 9.

It will be appreciated that the circuits and processing in the described apparatus is conventional and in use in the above-mentioned Zenith Electronics Corporation television receiver. The test signals are stored in a pair of registers 24a and 24b (FIG. 1B) and inserted into the luminance (luma) signal by a measuring pulse inserter 26 at appropriate times during the VBI in response to timing signals from circuit 6a. The white level test signal is supplied to register 24a or a programmable coefficient from microprocessor 5 via IM bus 9 and a coder/decoder (CODEC) 22. The black level test signal is stored as a fixed level, typically about 10 IRE units. Signals representing the resulting cathode currents, along with a signal representing CRT leakage (i.e. grid-cathode current flow when the CRT is cut off) is applied from RGB stage 3 to an analog-to-digital (A/D) converter 10 which in turn supplies a multiplexer 12. A signal from a photocell (PC) adjacent CRT 2 and representing the ambient light is also coupled to multiplexer 12 through A/D 10. Multiplexer 12 couples the four data inputs to measured data registers 14, 16, 18 and 20. Register 14 stores the sampled R, G or B white (Wh) signal cathode current value; register 16 stores the sampled R, G or B black (Bl) signal cathode current value; register 18 stores the measured leakage current value; and register 20 stores the photocell current value. The photocell current value stored in register 20 is coupled to CODEC 22 which provides a related signal on IM bus 9 for further processing.

The outputs of data registers 14 and 16 are coupled through a demultiplexer 28 to a positive input of a summer 30. Summer 30 also receives the output of leakage register 18, via an AND gate 19, at a negative input. A timing signal from timing circuit 6a controls operation of multiplexer 12, demultiplexer 28 and AND gate 19. The output of summer 30 develops R, G and B signals, in time multiplexed sequence, with each signal having had the CRT leakage measurement subtracted therefrom. Since, as a general rule, the leakage current will be much lower than the high data measurement, but probably comparable to the low data measurement, it is only necessary to subtract the leakage measurement from the low data. However, the invention contemplates subtracting the leakage current measurement from both the high data and the low data. The sequence of signals from summer 30 may then generally comprise R(Wh), R(Bl), G(Wh), G(Bl), B(Wh) and B(Bl). The output signal of summer 30 is supplied to a positive input of a second summer 32 in order to develop a time sequence of R, G and B difference signals.

A plurality of factory set reference levels are stored in registers 34, 36, 38, 40, 42 and 44. Each of the stored levels represents the manufacturer's established reference for the black signal and white signal cathode currents for the R, G and B signals applied to the particular CRT. The reference levels are coupled through a demultiplexer 45 to a negative input of summer 32 where subtraction of the corresponding R, G and B high and low data values occurs to produce the sequenced 8-bit R, G and B difference signals. The output of summer 32 will be zero when the measured and reference levels are equal and positive or negative depending upon the relative magnitudes of the compared levels.

An absolute value circuit 46 develops a 7-bit absolute value of the sequenced difference signals applied to its input. A truncating circuit 48 desensitizes the correction system by ignoring the two least significant bits in the output of absolute value circuit 46. A limit circuit 50 limits the truncated signal to the value 00111 and then drops the two most significant bits to produce a 3-bit output. The resultant 3-bit digital signal is supplied to a positive input of a summer 52 where black and white threshold levels, stored in registers 55 and 57 and supplied via a demultiplexer 59, are subtracted from the difference signals. The time multiplexed 3-bit difference signals produced at the output of summer 52 are time sequentially stored in a processed error register 54 where they are identified as error bits E2, E3 and E4.

A velocity control register 56, which is controllable from microprocessor 5, stores three corresponding control bits C0, C1 and C2 which may be programmed to assume any one of eight values. Three AND gates 58, 60 and 62 have an input each coupled to receive bits E2, E3 and E4 from processed error register 54 and one input each coupled to receive bits C0, C1 and C2 from velocity control register 56. The outputs of the AND gates are coupled to a demultiplexer 64 that has seven input taps wired as shown. Tap position 1, which constitutes the least significant bit (LSB), is connected to the output of AND gate 58, tap positions 2 and 3 are connected together and to the output of AND gate 60 and tap positions 4, 5, 6 and 7, constituting the most significant bits (MSB), are connected together and to the output of AND gate 62. A three bit counter 66 drives demultiplexer 64 to sequence through its tap positions and is, in turn, driven by a clock signal Fx. The output of the demultiplexer 64 is coupled to an AND gate 68 along with clock signal Fx.

Counter 66 operates the demultiplexer 64 to sequentially select each of its input taps for a period defined by 1/Fx. Demultiplexer 64 can be considered a simple switch that sequences through its input taps at an Fx rate. AND gates 58, 60 and 62 are only enabled when their corresponding C0, C1 and C2 inputs are high. Therefore, for maximum velocity or correction speed, C0, C1 and C2 are each set to 1. Consequently, the outputs of AND gates 58, 60 and 62 will be high in response to their E2, E3 and E4 input bits being high.

If, for example, the input tap labelled LSB is high when it is selected, AND gate 68 is enabled for a period Fx and one clock pulse is coupled to the output. Moving to the next input tap position of demultiplexer 64 and assuming that the output of AND gate 60 is high, another clock pulse will appear in the output of AND gate 68. Similarly, in the third tap position, another clock pulse will be generated. Assuming further that AND gate 62 has a high output, a clock pulse will be produced by AND gate 68 for each of the succeeding four input tap positions of demultiplexer 64. Therefore a maximum of seven clock pulses are produced by AND gate 68 for a processed error signal in which bits E2, E3 and E4 are all high and where the velocity control bits C0, C1 and C2 are all set to be high. This represents the highest correction speed available for the described system.

It should be apparent that a lower correction speed, i.e. fewer Fx clock pulses per correction sequence, is obtained by setting one or more of the velocity control bits C0, C1 or C2 to 0. With one or more control bits set to 0, the corresponding input taps on demultiplexer 64 will be low and no clock pulse will be generated by AND gate 68 when the input selector of demultiplexer 64 is on those taps. For example, if only the output of AND gate 60 is high, then two clock pulses will be produced by demultiplexer 64, corresponding to the input selector being on input taps 2 and 3. Similarly, if only the output of AND gate 62 is high, four clock pulses will be produced, corresponding to input taps 4, 5, 6 and 7. As mentioned, the velocity control bits are programmable by the microprocessor and may be selected to vary the speed at which correction occurs.

The clock pulses developed by AND gate 68 are coupled to the clock inputs of six up/down counters 70, 72, 74, 76, 78 and 80. A preset means 71 is supplied with the reference levels from the reference registers, which are preloaded into the counters by a suitable command from IM CODEC 22. Presetting of the counters immediately places them close to their proper settings. The UP/DN inputs of up/down counters 70-80 are supplied from a comparator 82 which compares the measured time sequenced R, G and B signals with their corresponding reference values or levels stored in registers 34-44 and develops a high output when the measured level exceeds the corresponding reference level and a low output when it is less than the reference level. A high output from comparator 82 operates counter 70-80 in a down direction and a low output operates the counters in an up direction. Each counter is operated in sequence in an up or a down direction for counting the number of Fx clock pulses supplied by AND gate 68 for each R, G and B signal component. The errors for each signal component are thereby accumulated in counters 70-80 and are coupled for appropriately adjusting the corresponding video drivers through a multiplexer 84 and a data transmitter 86.

It is recognized that numerous changes and modifications may be made to the preferred embodiment of the invention by those skilled in the art without departing from its true spirit and scope. The invention is to be limited only as defined in the claims.

What is claimed is:

1. An auto tracking system for a cathode ray tube comprising:
    operating means for controlling a display characteristic of a cathode ray tube;
    means for applying a test signal to sample said display characteristic;
    means for storing a reference for said display characteristic;
    comparison means for comparing said reference with said sample of said display characteristic;
    means coupled to said comparison means for adjusting said operating means for changing said display characteristic as a function of the difference between said sampled display characteristic and said reference; and
    means for varying the rate of adjustment of said operating means.

2. A digital auto tracking system for a cathode ray tube comprising:
    RGB means for driving a color cathode ray tube;
    test signal means for sampling a selected current supplied by said RGB means;
    register means for storing a reference level for said selected current;
    counter means for adjusting operation of said RGB means;
    comparison means for comparing said sampled selected current with said reference level;
    means for adjusting said counter means as a function of said comparison; and
    means for controlling the rate of adjustment of said counter means.

3. The system of claim 2, further including means for presetting said counter means with said reference level.

4. The system of claim 3, further including multiplexing means for sequentially operating said test signal means for successively sampling red, green and blue currents supplied to said cathode ray tube by said RGB means.

5. The system of claim 4 wherein said rate controlling means comprises a plurality of AND gates, each having one input controlled by the results of said comparison and each having another input controlled by the adjustment rate selected; and
    clock means for supplying clock pulses to said counter means in accordance with the inputs to said AND gates.

6. A digital auto tracking system having red, green and blue video driving means coupled to a cathode ray tube comprising:
    means for periodically developing test signals individually representative of display characteristics of said cathode ray tube;
    reference register means for storing digital data representative of desired display characteristics for said cathode ray tube;
    a plurality of up/down counters for adjusting said display characteristics;
    means for presetting said up/down counters with said stored digital data from said reference register means;
    means for comparing said test signals with said stored digital data and developing digital error signals therefrom;
    means for processing said digital error signals to develop a fixed number of error bits;
    logic means supplied with said fixed number of error bits and with programmable bits for developing outputs as a function of said error bits and said programmable bits; and
    means for changing said up/down counters in accordance with said output.

7. The system of claim 6, further including a source of clock pulses for changing said up/down counters; said programmable bits determining the maximum number of clock pulses applied to said up/down counters.

8. The system of claim 7 wherein said processing means comprises means for truncating and limiting said error signal to develop said fixed number of error bits.

* * * * *